(12) United States Patent
Dhandapani et al.

(10) Patent No.: US 9,978,038 B2
(45) Date of Patent: May 22, 2018

(54) AUTOMATED SYSTEMS FOR REDUCING COMPUTATIONAL LOADS IN THE MASS EXECUTION OF ANALYTICAL MODELS USING SCALE-OUT COMPUTING

(71) Applicant: Capital One Services, LLC, McLean, VA (US)

(72) Inventors: Chandra Dhandapani, Dallas, TX (US); Raman Bajaj, Frisco, TX (US); Gurmeet Singh, Irving, TX (US); Ajmal Karuthakantakath, Flower Mound, TX (US); Fredrick Crable, Allen, TX (US); Nicholas Dolle, Mckinney, TX (US); Vikramaditya Repaka, Allen, TX (US); Sanjiv Yajnik, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/709,231

(22) Filed: Sep. 19, 2017

(65) Prior Publication Data

US 2018/0005179 A1    Jan. 4, 2018

Related U.S. Application Data

(63) Continuation of application No. 15/381,906, filed on Dec. 16, 2016.
(Continued)

(51) Int. Cl.
*G06Q 10/08* (2012.01)
*G06N 5/04* (2006.01)
(Continued)

(52) U.S. Cl.
CPC ....... *G06Q 10/087* (2013.01); *G06F 17/5009* (2013.01); *G06N 5/045* (2013.01); *G06Q 40/025* (2013.01)

(58) Field of Classification Search
CPC .................................................. G06Q 40/025
(Continued)

(56) References Cited

U.S. PATENT DOCUMENTS 5,239,462 A    8/1993   Jones et al.
5,732,397 A *  3/1998   DeTore .................. G06Q 10/06
                                                        705/1.1
(Continued)

FOREIGN PATENT DOCUMENTS

WO    WO 01/55927 A1    8/2001

*Primary Examiner* — Russell S Glass
(74) *Attorney, Agent, or Firm* — Finnegan, Henderson, Farabow, Garrett & Dunner, LLP

(57) ABSTRACT

Disclosed embodiments provide systems and techniques for mass execution of analytical models across multiple dimensions of client, collateral, deal structure, third party, and other data relevant to predicting optimal decisions in real-time. In some embodiments, disclosed systems and techniques increase decisioning speed through the reduction of computational loads on disclosed decisioning systems. Further disclosed systems and techniques may scale-out analytical modeling computations through, among other technological solutions, advanced execution environments that are asynchronous and non-blocking in nature so as to allow the execution of a plurality of analytical models in parallel and optimizing the results.

20 Claims, 9 Drawing Sheets

Related U.S. Application Data

(60) Provisional application No. 62/269,529, filed on Dec. 18, 2015.

(51) Int. Cl.
*G06F 17/50* (2006.01)
*G06Q 40/02* (2012.01)

(58) Field of Classification Search
USPC .......................................................... 705/28
See application file for complete search history.

(56) References Cited

U.S. PATENT DOCUMENTS

| | | | |
|---|---|---|---|
| 5,870,721 | A | 2/1999 | Norris |
| 6,877,656 | B1 | 4/2005 | Jaros et al. |
| 7,131,583 | B2 | 11/2006 | Jaros et al. |
| 7,302,719 | B2 | 12/2007 | Jaros et al. |
| 7,395,239 | B1 | 7/2008 | Riseman |
| 7,885,890 | B2 | 2/2011 | Haertel |
| 8,145,556 | B2 | 3/2012 | Tealdi et al. |
| 8,463,661 | B2 | 6/2013 | Blair et al. |
| 8,706,592 | B2 | 4/2014 | Tealdi et al. |
| 2005/0080723 | A1* | 4/2005 | Burchetta .............. G06Q 20/10 705/39 |
| 2012/0185375 | A1* | 7/2012 | Tealdi .................. G06Q 20/105 705/37 |
| 2013/0139130 | A1* | 5/2013 | Anjan ................ G06F 11/3672 717/131 |

* cited by examiner

Dealer Access Portal

Vehicle — 410

- Make: Toyota
- Model: Sienna
- Year: 2015
- Style: XLE
- Good Condition
- <50,000 miles ☐ Consider other vehicles in dealer inventory — 440

Applicant — 420

- Name: John Smith
- Address: 123 Outoftheway Dr. Hererothere, HW 12345
- Employer: Acme, Inc.
- Annual Income: $85,000

Requested Loan — 430

- Length: 60 months
- Amount: $25,000
- Down Payment: $1,000
- Warranty Cost: $2,500

Submit → — 450

FIG. 4

| Deal Parameter | Transaction Proposal Parameters | Minimally Viable Transaction (MVT) Parameters | Variation Increments |
|---|---|---|---|
| Length of Loan | 60 | 75 | 6 months |
| Sales Price | $25,000 | $15,000 | $500 |
| Cash Down | $1,000 | $11,000 | $500 |
| Warranty Cost | $2,500 | $0 | $100 |

FIG. 5

Dealer Access Portal https://www.FinancialServiceProvider.com/Dealerxyz123/CustomerNo41783

Find a bank branch/ATM [Search]   Enter your five-digit ZIP Code

Log Out

Loan Approved at 3.42% APR!

Vehicle: 2015 Toyota Sienna XLE
Loan Terms: $25,000 for 60 months, $1,000 down, and $2,500 warranty cost
APR: 3.42%
Monthly Payment: $453.90

We've also found other deals you may like better:

1
Vehicle: 2015 Toyota Sienna XLE
Loan Terms: $25,000 for _72 months_, $1,000 down, and $0 warranty cost
APR: _3.39%_
Monthly Payment: _$384.22_

2
Vehicle: 2015 Toyota Sienna XLE
Loan Terms: _$15,000_ for 60 months, _$11,000 down_, and $2,500 warranty cost
APR: _4.76%_
Monthly Payment: _$281.42_

See more loan options...

■ Feedback

FIG. 6A

```
Decision Engine    x
← → × | https://www.FinancialServiceProvider.com/Dealerxyz123/CustomerNo41783
```

Dealer Access Portal

Find a bank branch/ATM

Search | 🔍

Enter your five-digit ZIP Code | 🔍

Log Out

650

*Your loan request was denied for:*

660
Vehicle: 2015 Toyota Sienna XLE
Requested Terms: $25,000 for 60 months, $1,000 down, and $2,500 warranty cost

*But we've identified these comparable deals you are approved for:*

670

| 1 | Vehicle: *2013 Toyota Sienna XLE*<br>Loan Terms: *$25,000* for 60 months, $1,000 down, and $2,500 warranty cost<br>APR: 3.42%<br>Monthly Payment: $453.90 |

| 2 | Vehicle: 2015 Toyota Sienna XLE<br>Loan Terms: *$15,000* for 60 months, *$11,000 down*, and $2,500 warranty cost<br>APR: 4.76%<br>Monthly Payment: *$281.42* |

| 3 | Vehicle: *2016 Kia Sedona*<br>Loan Terms: *$20,000* for 60 months, *$6,000 down*, and $1,000 warranty cost<br>APR: 4.66%<br>Monthly Payment: *$318.95* |

680
*See more loan options...*

Feedback

FIG. 6B

AUTOMATED SYSTEMS FOR REDUCING COMPUTATIONAL LOADS IN THE MASS EXECUTION OF ANALYTICAL MODELS USING SCALE-OUT COMPUTING

RELATED APPLICATIONS

This application is a continuation of and claims the benefits of U.S. patent application Ser. No. 15/381,906, filed Dec. 16, 2016, which claims the priority of U.S. Provisional Patent Application No. 62/269,529, filed Dec. 18, 2015. The U.S. patent application Ser. No. 15/381,906 and the U.S. Provisional Patent Application No. 62/269,529 are hereby incorporated by reference in their entireties.

BACKGROUND

The mass execution of analytical models across many dimensions of data to predict optimal transaction decisions is a computationally intensive and data intensive job that cannot be feasibly implemented in real-time on traditional computing systems. As a result, current decisioning systems require parties to iterate over potential transactions and transaction structures with only a vague sense of direction. Moreover, the more negotiable parameters that are added to a proposed transaction structure, the more exacerbated the shortcomings of existing decisioning systems become.

In view of these and other shortcomings and problems with traditional decisioning systems, improved systems and techniques for conducting mass execution of analytical models across many dimensions of data are desired in order to predict optimal transaction decisions in real-time.

SUMMARY

Disclosed embodiments provide systems and techniques for mass execution of analytical models across multiple dimensions of client, collateral, deal structure, third party, and other data relevant to predicting optimal decisions in real-time. In some embodiments, disclosed systems and techniques increase decisioning speed through the reduction of computational loads on disclosed decisioning systems. Further disclosed systems and techniques may scale-out analytical modeling computations through, among other technological solutions, advanced execution environments that are asynchronous and non-blocking in nature so as to allow the execution of a plurality of analytical models in parallel (and optimizing the results). Disclosed systems and techniques may also increase decisioning computation speeds by determining a minimally viable transaction (MVT) structure used for verifying an initial transaction proposal and setting the maximum extent that a transaction structure can become modified and remain acceptable. In some embodiments, disclosed systems and techniques may further identify an optimal transaction structure by executing a plurality of transaction structure variations for every transaction policy, and scoring, sorting, and ranking the variations. For example, disclosed embodiments may use parallel computing and big data techniques to scale-out the execution of analytical models against many variations of input to produce a range of transaction outcomes. These outcomes may then be analyzed against target decision outcomes to provide an optimal set of discreet decision possibilities.

Thus, the disclosed embodiments provide enhancements to decisioning system technology, and address problems with traditional decisioning systems unable to produce a similar range of tailored transaction outcomes, much less providing such outcomes in a timely fashion. The disclosed systems and methods may be implemented using a combination of conventional hardware, firmware, and/or software as well as specialized hardware, firmware, and/or software, such as a machine constructed and/or programmed specifically for performing functions associated with the disclosed method steps. In some embodiments, however, disclosed systems and methods may be implemented instead in dedicated electronics hardware.

Consistent with the present embodiments, a system for mass execution of analytical models is disclosed. The system may include a memory storing instructions and one or more processors. The one or more processors may be configured to execute the instructions to perform operations. The operations may include, for example, receiving, via an Application Programming Interface (API), a transaction proposal including a first plurality of transaction parameters. The operations may further include iteratively verifying, via an actor pool associated with a data interface module, a plurality of data sources identified based on the received transaction proposal. The operations may also include generating a minimally viable transaction (MVT) including a second plurality of transaction parameters based on the transaction proposal. The operations may further include generating, via an actor pool associated with a transaction generator, a plurality of transaction options based on the transaction proposal and the MVT. The operations may also include scoring, via an actor pool associated with a scoring engine, each of the plurality of transaction options using the at least one analytical model, and verifying, via an actor pool associated with a policy calculator, that the each of the plurality of transaction options complies with a transaction policy based on the scoring. The operations may also include optimizing, via an actor pool associated with a transaction optimizer, the plurality of transaction options based on at least one preference, and transmitting, via the API, at least one transaction offer based on the optimized plurality of transaction options.

Consistent with the present embodiments, a method for mass execution of analytical models is disclosed. The method may include, for example, receiving, via an Application Programming Interface (API), a transaction proposal including a first plurality of transaction parameters. The method may further include iteratively verifying, via an actor pool associated with a data interface module, a plurality of data sources identified based on the received transaction proposal. The method may also include generating a minimally viable transaction (MVT) including a second plurality of transaction parameters based on the transaction proposal. The method may further include generating, via an actor pool associated with a transaction generator, a plurality of transaction options based on the transaction proposal and the MVT. The method may also include scoring, via an actor pool associated with a scoring engine, each of the plurality of transaction options using the at least one analytical model, and verifying, via an actor pool associated with a policy calculator, that the each of the plurality of transaction options complies with a transaction policy based on the scoring. The method may also include optimizing, via an actor pool associated with a transaction optimizer, the plurality of transaction options based on at least one preference, and transmitting, via the API, at least one transaction offer based on the optimized plurality of transaction options.

Aspects of the disclosed embodiments may include tangible computer-readable media that store software instructions that, when executed by one or more processors, are configured for and capable of performing and executing one or more of the methods, operations, and the like consistent with the disclosed embodiments.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 4 is an exemplary table reflecting transaction proposals, consistent with disclosed embodiments.

FIG. 5 is an exemplary interface for receiving transaction proposal data, consistent with disclosed embodiments.

FIGS. 6A-B are exemplary interfaces for displaying a transaction proposal response, consistent with disclosed embodiments.

DESCRIPTION OF THE EMBODIMENTS

Disclosed embodiments improve the intelligence of real-time decisioning systems by configuring advanced execution environments that are asynchronous and non-blocking in nature so as to allow the parallel execution of analytical models across multiple dimensions of data relevant to predicting optimal decisions. To achieve these improvements in decisioning technology, among other things, the disclosed embodiments may determine a minimally viable transaction (MVT) structure, setting the maximum extent that a transaction structure can become modified and remain acceptable, and scale-out the analytical modeling computations only within the acceptable range of variations.

In some embodiments, disclosed systems and techniques may further identify an optimal transaction structure (or set of structures) by executing transaction structure variations for every transaction policy and scoring, sorting, and ranking the variations. For example, disclosed embodiments may use parallel computing and big data techniques to scale-out the computation of analytical models against many variations of input to produce a range of transaction outcomes. These outcomes may then be analyzed against target decision outcomes to provide an optimal set of discreet decision possibilities.

Reference will now be made in detail to exemplary embodiments, examples of which are illustrated in the accompanying drawings and disclosed herein. Wherever convenient, the same reference numbers will be used throughout the drawings to refer to the same or like parts. For ease of discussion, the present disclosure may describe embodiments in the context of a financial service provider predicting an optimal set of vehicle loan offers in response to receiving a loan application. It is to be understood, however, that disclosed embodiments are not limited to the vehicle loans, home loans, land loans, personal loans, lines of credit, sale of goods or services, etc. Rather, disclosed systems and techniques for mass execution of analytical models across multiple dimensions of data relevant to predicting optimal decisions in real-time may be employed to respond to any type of negotiation involving variable terms. Indeed, disclosed embodiments are not limited to the financial service industry and, in fact, are not limited to any particular industry or field.

Figure 1:
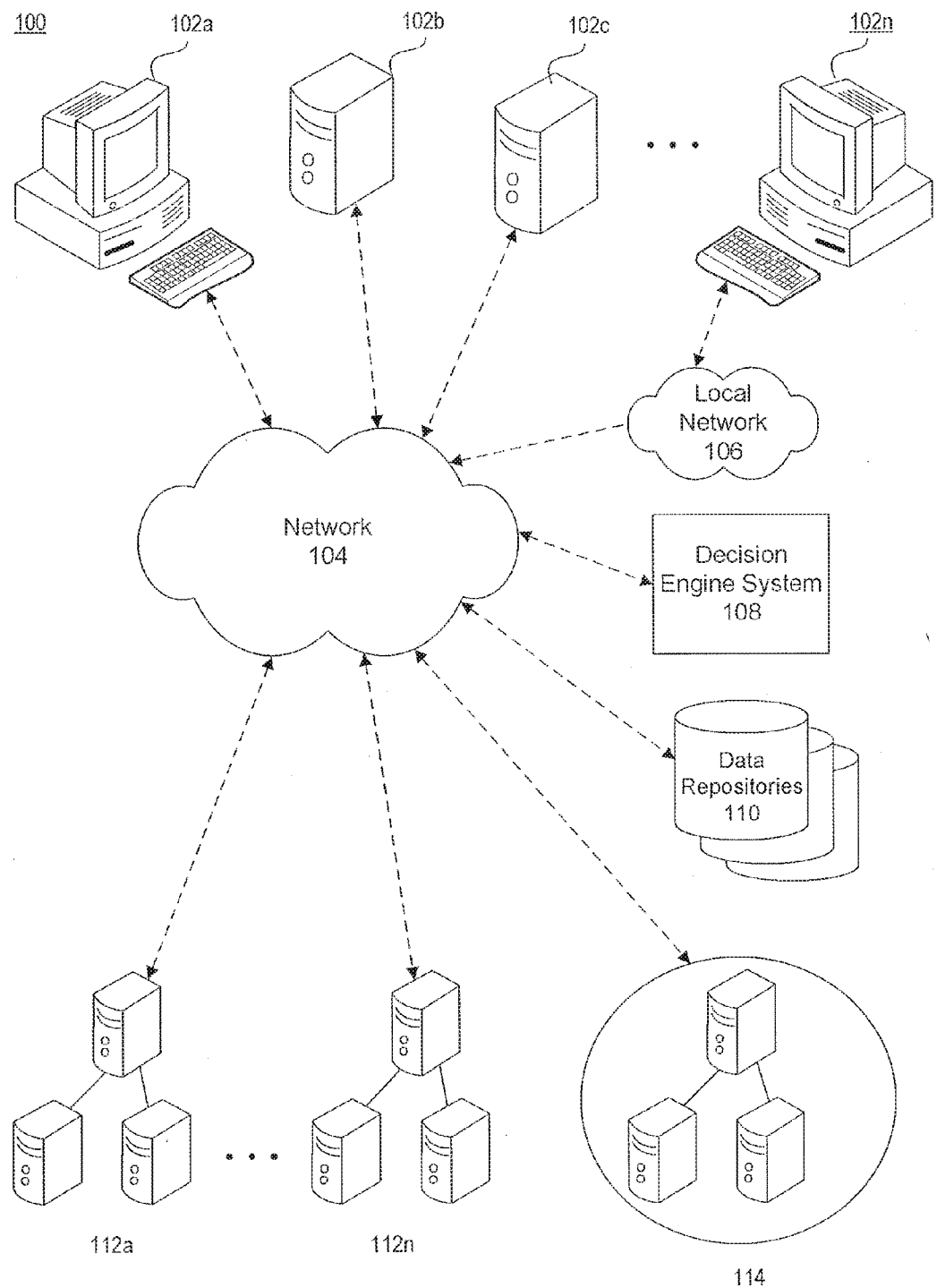
FIG. 1 is a schematic diagram illustrating an exemplary system environment for mass execution of analytical models using scale-out computing to predict optimal decisions, consistent with disclosed embodiments.

FIG. 1 is a schematic diagram of an exemplary system environment for mass execution of analytical models using scale-out computing to predict optimal decisions, consistent with disclosed embodiments. In particular, FIG. 1 shows a diagram of an exemplary system 100, consistent with disclosed embodiments, revealing some technical aspects of the present disclosure for achieving the intended results of the present disclosure. Referring to FIG. 1, system 100 may include a plurality of client devices 102, a network 104, local network 106, a decision engine system 108, a plurality of data repositories 110, a plurality of server clusters 112, and a cloud service 114. The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

As shown in FIG. 1, the plurality of client services 102 may be implemented using a variety of different equipment, such as supercomputers, personal computers, servers, mainframes, mobile devices like smart phones and tablets, etc. In some embodiments, client device(s) 102 may be configured to receive input from a user, such as input regarding a transaction proposal (e.g., a loan application). For example, client device(s) 102 may execute a web browser application to present a web page through which a user may submit a transaction proposal. Client devices 102 may send that inputted data (e.g., transaction proposal) to decision engine system 108 for processing. In some embodiments, client device(s) 102 may be associated with an applicant for a vehicle loan. Additionally or alternatively, client device(s) 102 may be associated with an intermediary or point of sale, such as an automotive dealer. Client devices 102 may be connected to a network such as network 104. In some embodiments, client devices 102 may be connected to a local network (e.g., a local network of an automotive dealer), such as local network 106.

Network 104, in some embodiments, may comprise one or more interconnected wired or wireless data networks that receive data from one device (e.g., decision engine system 108) and send it to another device (e.g., server clusters 112 and/or cloud service 114). For example, network 104 may be implemented as the Internet, a wired Wide Area Network (WAN), a wired Local Area Network (LAN), a wireless LAN (e.g., IEEE 802.11, Bluetooth, etc.), a wireless WAN (e.g., WiMAX), or the like. Each component in system 100 may communicate bidirectionally with other system 100 components either through network 104 or through one or more direct communication links (not shown).

Decision engine system 108 may be implemented using a variety of different equipment, such as one or more supercomputers, one or more personal computers, one or more servers (e.g., server clusters 112 and/or cloud service 114), one or more mainframes, one or more mobile devices, or the like. In some embodiments, decision engine system 108 may comprise hardware, software, and/or firmware modules. Decision engine system 108 may be configured to receive a transaction proposal including a proposed transaction structure (e.g., a loan application proposing a set of terms), identifying flexible parameters of the proposed transaction structure (e.g., a loan amount, cash down required, annual percentage rate (APR), length of loan, warranty costs, etc.), coordinate parallel computing of analytical models against the potential variations of the transaction structure given the flexible transaction parameters, and score and rank the potential variations according to the preferences of those involved in the proposed transaction (e.g., a financial service provider, automotive dealer, and/or vehicle purchaser and loanee). In some embodiments, decision engine system 108 may run machine learning, trending, and/or pattern recognition algorithms to further refine the identification and/or ranking of transaction structures that appeal to involved parties. Additionally or alternatively, decision engine system 108 may present the identified transaction structures in a spider graph (e.g., web chart, star chart, star plot, cobweb chart, irregular polygon, polar chart, kiviat diagram, etc.) having radii representing, for example, various variable terms of the transaction.

Data repositories 110 may be configured to store information consistent with the disclosed embodiments. In some aspects, components of system 100 (shown and not shown) may be configured to receive, obtain, gather, collect, generate, or produce information to store in data repositories 110. In certain embodiments, for instance, components of system 100 may receive or obtain information for storage over communications network 104 (and/or local network 106). By way of example, data repositories 110 may store vehicle inventory information of an automotive dealer. In another example, data repositories 110 may store credit information associated with individuals collected and/or generated by a credit bureau. In other aspects, components of system 100 may store information in data repository 110 without using network 104 (e.g., via a direct connection). In some embodiments, components of system 100, including but not limited to decision engine system 108, may use information stored within data repository 110 for processes consistent with the disclosed embodiments Server clusters 112 may be located in the same data center or in different physical locations. Multiple server clusters 112 may be formed as a grid to share resources and workloads. Each server cluster 112 may include a plurality of linked nodes operating collaboratively to run various applications, software modules, analytical models, rule engines, etc. Each node may be implemented using a variety of different equipment, such as a supercomputer, personal computer, a server, a mainframe, a mobile device, or the like. In some embodiments, the number of servers and/or server clusters 112 may be expanded or reduced based on workload. In some embodiments, one or more components of decision engine system 108 (including one or more server clusters 112) may be placed behind a load balancer to support high availability and ensure real-time (or near real-time) processing of optimal decision predictions, consistent with disclosed embodiments.

Cloud service 114 may include a physical and/or virtual storage system associated with cloud storage for storing data and providing access to data via a public network such as the Internet. Cloud service 114 may include cloud services such as that offered by, for example, Amazon, Apple, Cisco, Citrix, IBM, Joyent, Google, Microsoft, Rackspace, Salesforce.com and Verizon/Terremark, or other types of cloud services accessible via network 104.

In some embodiments, cloud service 114 comprises multiple computer systems spanning multiple locations and having multiple databases or multiple geographic locations associated with a single or multiple cloud storage service(s). As used herein, cloud service 114 refers to physical and virtual infrastructure associated with a single cloud storage service. In some embodiments, cloud service 114 manages and/or stores data associated with mass execution of analytical models using scale-out computing to predict optimal decisions.

Figure 2:
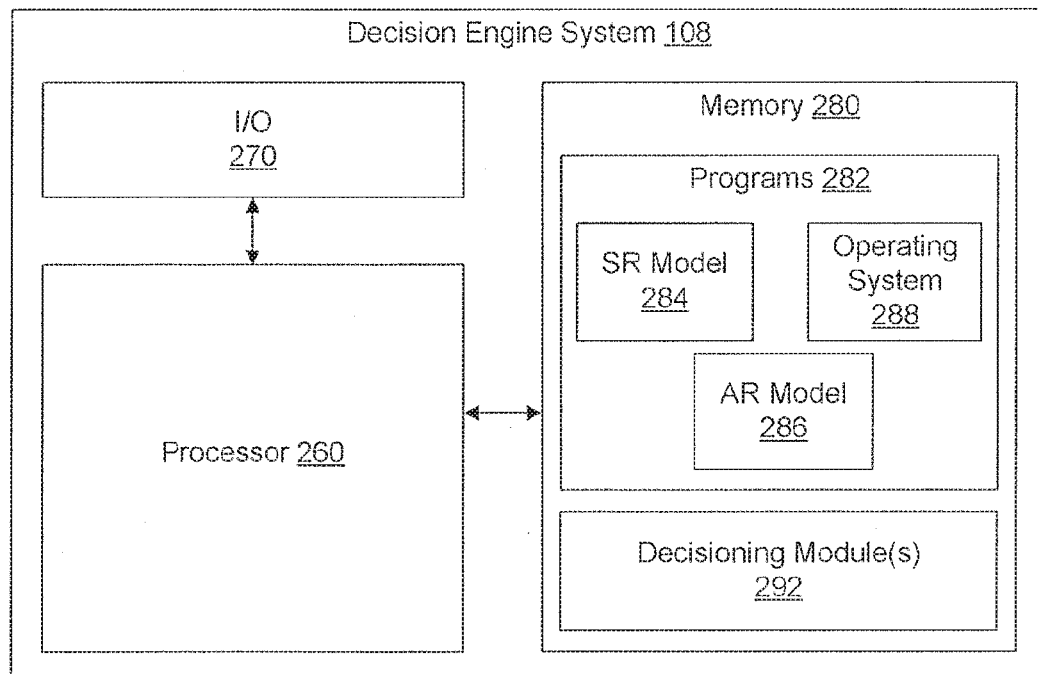
FIG. 2. is a diagram of an exemplary decisioning engine system configured to perform functions of the disclosed methods, consistent with disclosed embodiments.

FIG. 2 is a diagram of an exemplary decisioning engine configured to perform functions of the disclosed methods, consistent with disclosed embodiments. As shown, decision engine system 108 may include one or more processor 260, input/output ("I/O") devices 270, and memory 280 storing data and programs 282 (including, for example, structure risk (SR) model(s) 284, applicant risk (AR) model(s), and operating system 288). As noted above, decision engine system 108 may be a single server or may be configured as a distributed computer system including multiple servers or computers (e.g., server clusters 112 and/or cloud service 114) that interoperate to perform one or more of the processes and functionalities associated with the disclosed embodiments. In some embodiments, decision engine system 108 is specially configured with hardware and/or software modules for performing functions of disclosed methods. For example, decision engine system 108 may include programs 282 (including Structure Rating (SR) model(s) 284 and Applicant Rating (AR) model(s)) and/or decisioning module(s) 292. The modules can be implemented as specialized circuitry integrated within processor 260 or in communication with processor 260, and/or specialized software stored in memory 280 (as depicted in FIG. 2) executable by processor 260.

Processor 260 may be one or more known or custom processing devices designed to perform functions of the disclosed methods, such as a single core or multiple core processors capable of executing parallel processes simultaneously. For example, processor 260 may be configured with virtual processing technologies. In certain embodiments, processor 260 may use logical processors to simultaneously execute and control multiple processes. Processor 260 may implement virtual machine technologies, including a Java virtual machine, or other known technologies to provide the ability to execute, control, run, manipulate, store, etc. multiple software processes, applications, programs, etc. In another embodiment, processor 260 may include a multiple-core processor arrangement (e.g., dual core, quad core, etc.) configured to provide parallel processing functionalities to allow decision engine system 108 to execute multiple processes simultaneously. One of ordinary skill in the art would understand that other types of processor arrangements could be implemented that provide for the capabilities disclosed herein.

Decision engine system 108 may also include one or more I/O devices 270 that may comprise one or more interfaces for receiving signals or input from devices and providing signals or output to one or more devices that allow data to be received and/or transmitted by decision engine system 108. Decision engine system 108 may also include interface components that display information and/or provide interfaces to one or more input devices, such as one or more keyboards, mouse devices, and the like, that enable in decision engine system 108 to receive input from a user or administrator (not shown).

Decision engine system 108 may include one or more storage devices configured to store information used by processor 260 (or other components) to perform certain functions related to the disclosed embodiments. In one example, decision engine system 108 may include memory 280 that includes instructions to enable processor 260 to execute one or more applications, such as SR model(s) 284 and/or AR model(s), server applications, network communication processes, and any other type of application or software known to be available on computer systems. Alternatively or additionally, the instructions, application programs, etc. may be stored in an internal database or external storage (not shown) in direct communication with decision engine system 108, such as one or more database or memory accessible over network 104. The internal database and external storage may be a volatile or non-volatile, magnetic, semiconductor, tape, optical, removable, non-removable, or other type of storage device or tangible (i.e., non-transitory) computer-readable medium.

Decision engine system 108 may also be communicatively connected to one or more remote memory devices (e.g., remote databases (not shown)) through network 104 or a different network. The remote memory devices may be configured to store information (e.g., structured, semi-structured, and/or unstructured data) and may be accessed and/or managed by decision engine system 108. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

In one embodiment, decision engine system 108 may include memory 280 that includes instructions that, when executed by processor 260, perform one or more processes consistent with the functionalities disclosed herein. Methods, systems, and articles of manufacture consistent with disclosed embodiments are not limited to separate programs or computers configured to perform dedicated tasks. For example, decision engine system 108 may include memory 280 that may include one or more programs 282 and/or decisioning module(s) 292 to perform one or more functions of the disclosed embodiments. Moreover, processor 260 may execute one or more programs located remotely from system 100. For example, decision engine system 108 may access one or more remote programs, that, when executed, perform functions related to disclosed embodiments.

Memory 280 may include one or more memory devices that store data and instructions used to perform one or more features of the disclosed embodiments. For example, memory 280 may represent a tangible and nontransitory computer-readable medium having stored therein computer programs, sets of instructions, code, or data to be executed by processor 260. Memory 280 may include, for example, a removable memory chip (e.g., EPROM, RAM, ROM, DRAM, EEPROM, flash memory devices, or other volatile or non-volatile memory devices) or other removable storage units that allow instructions and data to be accessed by processor 260.

Memory 280 may also include any combination of one or more relational and/or non-relational databases controlled by memory controller devices (e.g., server(s), etc.) or software, such as document management systems, Microsoft SQL databases, SharePoint databases, Oracle™ databases, Sybase™ databases, or other relational databases, or non-relational databases such as key-value stores or NoSQL databases such as Apache HBase™. In some embodiments, memory 280 may comprise an associative array architecture, such as a key-value storage, for storing and rapidly retrieving large amounts of information.

Programs 282 stored in memory 280 and executed by processor(s) 260 may include one or more SR model(s) 284, AR model(s) 286, and operating system 288. Programs 282 may also include one or more machine learning, trending, and/or pattern recognition applications (not shown) that cause processor(s) 260 to execute one or more processes related to identifying, scoring, and/or ranking of transaction structures. For example, the one or more machine learning, trending, and/or pattern recognition may provide, modify, or suggest input variables associated with one or more other programs 282.

Consistent with disclosed embodiments, decision engine system 108 may execute one or more scoring models, including but not limited to SR model(s) 284 and AR model(s) 286, for every user (e.g., loan applicant), transaction proposal (e.g., loan application), every potential variation of the transaction proposal, and/or response to a transaction proposal (e.g., loan offers). The scoring models may be analytical models applying, for example, linear regression algorithms and/or boosted tree algorithms. The scoring models may leverage structured data (e.g., fixed field data received from credit bureau databases, data received from dealer website via an API, etc.) or unstructured data (e.g., images of loan application documents or supporting documents, images of the collateral, etc.) produce scores indicating the risk and/or acceptability associated with a user, transaction proposal, all acceptable transaction structure variants of a transaction proposal, and/or transaction proposal responses. For example, in the case of a loan application for an automotive purchase, the scoring models may produce a score that rates the applicant, each potential transaction structure of the loan sought, and/or the loan offers provided in response to the auto loan request according to credit risk, loan preferences, and/or other factors (including those either learned or suggested).

Consistent with disclosed embodiments, AR model 286 may be configured to assess the risk associated with a user or entity that has submitted a transaction request. For instance, in the example where the applicant is a consumer that submitted a loan application seeking a loan to fund a vehicle purchase, AR model 286 may receive input variables associated with assessing the consumer's creditworthiness (e.g., FICO score, credit history, income, etc.) and produce a score rating the credit risk associated with providing a loan to the consumer. In some embodiments, one or more scores generated by other models (shown and not shown) may additionally be received as an input variable. In some embodiments, multiple versions of models may be used in combination to test all aspects of risk.

Consistent with disclosed embodiments, SR model 284 may be configured to assessing the risk associated with potential transaction structures. For example, SR model 284 may receive a plurality of input variables that are acceptable to a transaction policy and produce scores indicating the risk associated with approving a transaction according to that transaction structure. For instance, continuing the above example, SR model 284 may receive input variables associated with a potential transaction structure for the sought vehicle loan (e.g., loan to value (LTV) ratio, loan to income (LTI) ratio, AR model 286 score, etc.) and produce a scoring rating the risk associated with a loan according to the transaction structure. As discussed herein, SR model 284 may score every potential transaction structure associated with processing a transaction proposal. In some embodiments, one or more scores generated by other models (shown and not shown) may additionally be received as an input variable.

According to some embodiments, decision engine system 108 may also validate scores produced by the scoring model(s) according to a transaction policy. The transaction policy may define the relationship between the score produced by a model and the input variables. In some instances, scores produced by a model within defined ranges may dictate the range of input variables that are acceptable to the transaction policy (referred to herein as the transaction policy rules). For example, when an AR model 286 produces a score in a lower range (indicating a higher credit risk associated with the applicant), then the transaction policy rules may require the LTV ratio provided as input for SR model 284 to remain below a threshold level in order to comply with the transaction policy. In another example, the transaction policy rules may allow a pricing model to accept a higher overall cost (e.g., loan amount) as an input variable when an SR model score is produced in a high range (indicating a lower risk transaction structure). In some embodiments, the transaction policy rules may dictate which models become run on the transaction request (and/or variations thereof) based on input variables and/or scoring my other models.

Decisioning module(s) 292 may be stored in memory 280 and executed by processor(s) 260 to implement one or more parts of a decisioning system comprising fault-tolerant and scalable applications, such as applications built upon an Actor, message, or Lambda based architecture. Additional details regarding decisioning module(s) 292 is discussed below with respect to exemplary decisioning system 300 of FIG. 3.

Figure 3:
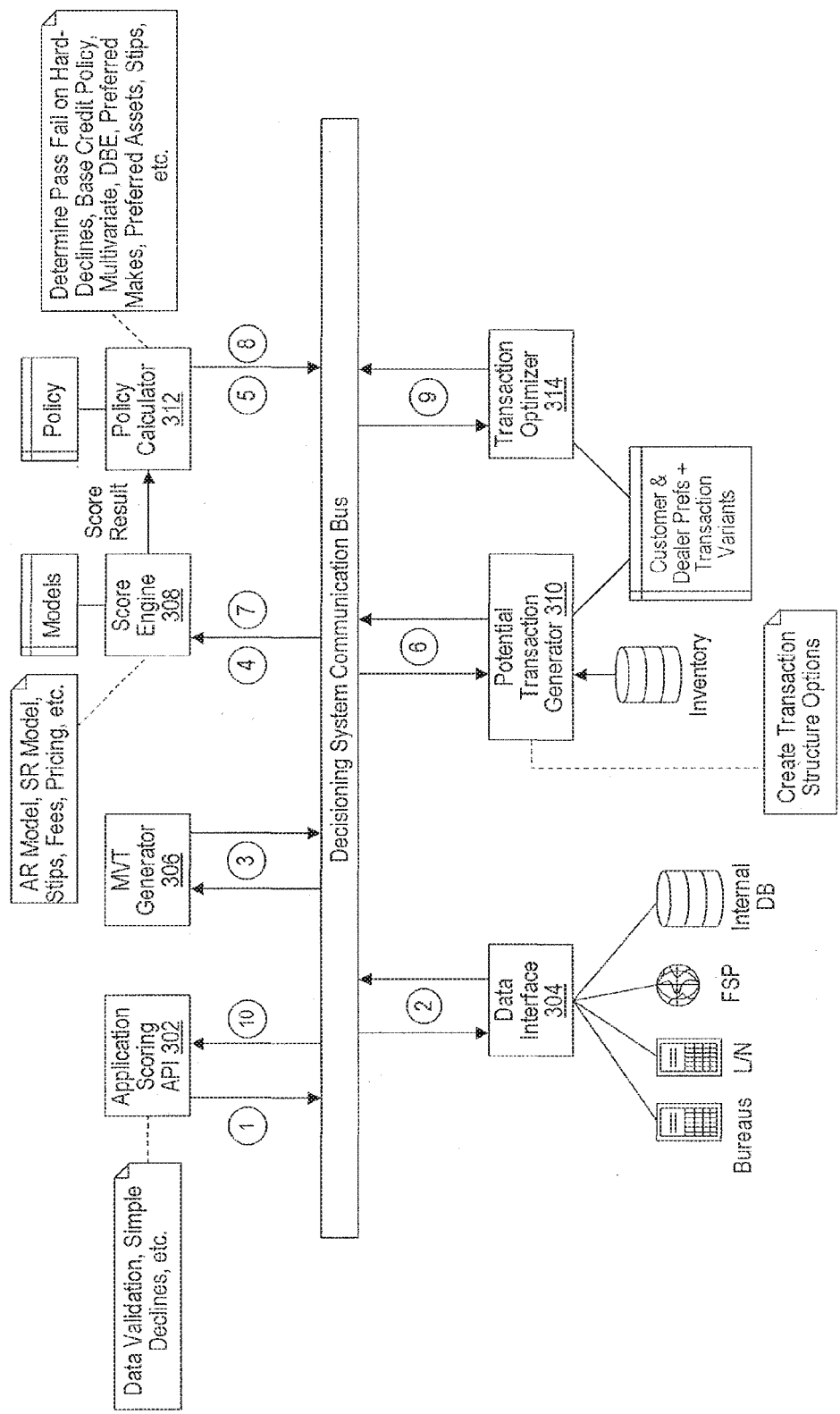
FIG. 3 is an exemplary decisioning system 300 and decisioning module messaging handling sequence for predicting optimal decisions, consistent with disclosed embodiments.

FIG. 3 is an exemplary decisioning system 300 and decision module messaging handling sequence for predicting optimal decisions, consistent with disclosed embodiments. As noted above, decisioning system 300 may comprise one or more fault-tolerant and scalable applications (referred to herein as decisioning module(s) 292) executed by decision engine system 108. Decisioning system 300 may be a message-based system wherein decisioning module(s) 292 act on messages sent through the decisioning system 300. Decisioning module(s) 292 may include, but are not limited to: data interface 304, MVT generator 306, score engine 308, potential transaction generator 310, policy calculator 312, and/or transaction optimizer 314.

Each module among decisioning module(s) 292 may be independent to work on a given message as it is received/retrieved. Indeed, although operations discussed below may be described as occurring in a particular sequence for ease of discussion, it should be understood that disclosed operations, events, etc. may occur in parallel and/or simultaneously. Further, decisioning module(s) 292 may become replicated to scale out operations as needed to respond to a transaction proposal in real-time. Decisioning module(s) 292 may be deployed as remote actors or as components in big data systems such as Spark or Hadoop. In some embodiments, subsystem 300 may be packaged as a set of JAR (Java Archive) files or other packaged file format that compose the libraries and decisioning modules 292 used in the subsystem.

Decision engine system 108 (via, e.g., server cluster 112 and/or cloud service 114) may perform some or all steps of discloses processes via the specialized hardware and/or software configured to perform functions related to disclosed embodiments. It is to be understood, however, that in some embodiments one or more other devices may perform one or more steps described below, such as client devices 102.

As shown in FIG. 3, decision system 300 may receive a transaction proposal via application scoring API 302. For example, a client device 102 associated with a vehicle purchaser and/or automotive dealer may make an API call to a RESTful API to submit a loan application to a financial institution (or other credit handler) associated with decision engine system 108. In some embodiments, client device 102 may submit the transaction proposal via a web page or other access portal. For example, as depicted in FIG. 4, an interface 400 may be provided for accepting transaction proposals. Interface 400 may include input fields (text field, dropdown menus, checkboxes, image upload areas, etc.) for accepting information associated with a transaction proposal, such a vehicle loan application. For example, interface 400 may include a vehicle area 410 providing input fields for receiving vehicle identifying information for a vehicle associated with a loan request. Similarly, interface 400 may include an applicant area 420 providing input fields for receiving applicant information. Further, interface 400 may include a loan area 430 providing input fields for receiving proposed transaction parameters (e.g., requested loan terms). Interface 400 may also include an input means 440 for receiving an indication that the decision engine may provide loan offers associated with vehicles other than that identified in vehicle area 410.

Returning to FIG. 3, in some embodiments, a RESTful API 311 may be responsible for simple data validation, input formatting, etc. and decline the application based on detected errors without passing on the transaction proposal to decisioning module(s) 292. Similarly, application scoring API 302 may process the transaction proposal for application pre-acceptance and approve the transaction proposal based on pre-acceptance criteria. Application scoring API 302 may construct a proposal message based on the transaction proposal.

Data interface 304 may retrieve the application message and operate as an interface to internal and/or additional data sources (such as credit bureaus, financial service providers, etc.) storing information that may become acted upon by other decisioning model(s) 292 in processing the transaction proposal. For example, data interface 304 may extract identifying information for a loan applicant from the application message (e.g., name, address, employers, social security number, driver's license number, financial account number, etc.) and acquire a credit rating for the applicant from a credit bureau, account balance of the applicant from financial service providers, income information from an employer of the applicant, etc. Data interface 304 may further parse, store, and validate the acquired data. Data interface 304 may also access local storage when, for example, the transaction proposal is a resubmission, and the information relevant to the transaction proposal (and/or acting on the transaction proposal) has previously been acquired by data interface 304. Data interface 304 may further receive input from a user or administrator of decision engine system 108. Data interface 304 may construct a message reflecting the application proposal and collected data.

MVT generator 306 may retrieve the message reflecting the application proposal and collected data and generate a minimally viable transaction (MVT). In some embodiments, the MVT may be the maximum extent to which a transaction proposal (e.g., as indicated by the applicant in loan area 430) can be modified and remain acceptable. For example, referring to FIG. 5, decision engine system 108 may receive a transaction proposal requesting a vehicle loan according to a deal structure having parameters including length of loan 501, sales price 503, cash down 505, and warranty costs 507. As shown in FIG. 5, the transaction proposal may request deal parameters 502 including: a 60-month length of loan, a $25,000 sales price/loan amount, a $1,000 cash down, and $2,500 warranty cost coverage. MVT Generator 306 may modify these deal parameters to the maximum extent the scoring models, such as SR model 284 and AR model 286, can produce a score that remains valid under the transaction policy. (If an MVT cannot become verified, a message rejecting the transaction request may be transmitted to the requestor via Application Scoring API 302 for presentation.) In the example depicted in FIG. 5, MVT Generator 306 identified MVT parameters 504 including: 75-month length of loan, $15,000 sales price, $11,000 cash down, and $0 warranty cost. Data interface 304 may also construct a message reflecting the application proposal, collected data, and MVT.

Returning to FIG. 3., score engine 308 may retrieve the message reflecting the application proposal, collected data, and/or MVT and generate an MVT score. (As discussed below, score engine 308 may also generate a score for all transaction parameter variations between transaction proposal 502 and MVT 504.) For example, score engine 308 may apply one or more scoring models, including but not limited to SR model(s) 284 and AR model(s) 286 to the MVT structure/MVT parameters 504 in order to produce an MVT score indicating the risk associated with the MVT structure. Score engine 308 may pass the MVT score to policy calculator 312 for verification/validation.

Policy calculator 312 may validate the MVT score as conforming to the transaction policy defining, among other things, the relationship between the score produced by a model and the input variables. For example, policy calculator 312 may confirm that all input variables for the one or more applied scoring models complied with the transaction policy associated with the MVT. (As discussed below, policy calculator 312 may also validate any and all scores generated on each transaction parameter variation between transaction proposal 502 and MVT 504.) Policy calculator 312 may also construct a message reflecting the application proposal, collected data, and validated MVT.

Potential transaction generator 310 may retrieve the message reflecting the application proposal, collected data, and validated MVT and generate a plurality of transaction options. The plurality of transaction options may represent, for example, alternative transaction structures to that indicated by the transaction proposal. In particular, potential transaction generator 310 may identify all possible transaction parameter variations between transaction proposal 502 and MVT 504. For example, potential transaction generator 310 may identify variation increments 506 (e.g., step deltas) for incrementing or decrementing each transaction parameter 501, 503, 505, and 507 between the parameters associated with transaction proposal 502 and MVT 504. Thus, with respect to the example depicted in FIG. 5, potential transaction generator 310 may identify a variation increment 506 for the length of loan parameter 501 as being 6-month increments (between 60-75 months), $500 increments for the sales price parameter 503 (between $15,000-$25,000), $500 increments for the cash down parameter 505 (between $1,000-$11,000), and $100 increments for the warranty costs parameter 507 (between $0-$2,500). Thus, with the minimum value, maximum value, and variation increment known for each transaction parameter, potential transaction generator 310 may identify all possible combinations of the transaction parameters between transaction proposal 502 and MVT 504 at the variation increments 506. The resulting set of transaction options may be expressed as a transaction structure vector.

Score engine 308 may retrieve a message reflecting at least the transaction structure vector and generate a transaction option score for each transaction operation identified by potential transaction generator 310. For example, score engine 308 may apply one or more scoring models, including but not limited to SR model(s) 284 and AR model(s) 286 to each transaction option to produce a transaction option score indicating the risk associated with each transaction option. The scoring may occur in the same or similar manner as discussed above with respect to scoring MVT 504. Score engine 308 may pass the transaction option scores to policy calculator 312.

Policy calculator 312 may validate the transaction option scores as conforming to transaction policy. For example, policy calculator 312 may confirm that all input variables for the one or more applied scoring models complied with the transaction policy associated with the underlying transaction option scored. Policy calculator 312 may also construct a message reflecting the application proposal, collected data, transaction structure vector, and validated transaction option scores (which may be similarly expressed in vector form).

Potential transaction generator 310 may also identify one or more additional vehicles and generate a plurality of additional transaction options as alternatives to transaction proposal. For example, potential transaction generator 310 may identify one or more additional vehicles as an alternative to the vehicle associated with the transaction proposal when the transaction proposal is not valid (e.g., when the transaction proposal does not fall within the MVT parameters and/or policy calculator 312 determined the MVT score was invalid for not conforming to the transaction policy). In other embodiments, potential transaction generator 310 may identify one or more additional vehicles as an alternative to supplement to the transaction options associated with the original vehicle. For example, the applicant may have indicated in input means 440 a desire to receive loan offers for vehicles other than that identified in the transaction proposal. Potential transaction generator 310 may identify the one or more additional vehicles based on one or more preferences associated with the customer and/or dealer.

Regardless, each alternative associated with an additional vehicle may become subjected to the same or similar processing, scoring, validation, etc. as discussed above with respect to the transaction proposal, MVT transaction structure, and transaction options. Specifically, for each additional vehicle, MVT generator 306 may generate an additional MVT in the same or similar manner to that done above with respect to the transaction proposal and vehicle identified therein. Score engine 308 may also score each of the additional MVTs, and policy calculator 312 may verify that each of the additional MVTs comply with transaction policy. Potential transaction generator 310 may then retrieve a message reflecting all the verified additional MVTs and generate a plurality of transaction options as alternatives to the transaction structure indicated the transaction proposal for each additional vehicle. The resulting set of additional transaction options may be expressed as an additional transaction structure vector.

Transaction optimizer 314 may retrieve a message indicating the potential transactions (e.g., the transaction proposal, MVT transaction, the plurality of transaction options (e.g., transaction structure vector), and plurality of additional transaction options (e.g., additional transaction structure vector, and associated validated scores) and construct an optimized response to the transaction proposal. For example, transaction optimizer 314 may prioritize the potential transactions according to transaction score (e.g., MVT score, transaction option scores, etc.) and/or customer preferences, dealer preferences, and/or lender preferences. In some embodiments, the optimizer may select transactions based on learned preferences based on historical trends of similar transactions. In some embodiments, transaction optimizer 314 may select a predetermined number of top transaction scores to provide in ranked order as deal offers to the applicant. Additionally or alternatively, transaction optimizer 314 may prioritize potential transactions according to a customer preference associated with one or more transaction parameters or associated offer terms. For example, transaction optimizer 314 may prioritize potential transactions based on the APR based on a customer preference for a low APR over other parameter considerations. Similarly, transaction optimizer 314 may prioritize the potential transactions based on a customer preference for lower monthly payments over other parameter considerations. Transaction optimizer 314 may generate an offer message reflecting the optimized response to the transaction proposal reflecting the prioritized/ranked deal offers.

The offer message may be transmitted to the requestor via Application Scoring API 302 for presentation. For example, decision engine 108 may generate web page data for client device 102 to display the offer message. FIGS. 6A-B are exemplary interfaces for displaying a transaction proposal response (e.g., an offer message), consistent with disclosed embodiments.

As depicted in FIG. 6A, an interface 600 may become generated with a selectable area 610 indicating that the transaction proposal is accepted and disclosing the offer terms (e.g., APR rate, monthly payment, etc.). Interface 600 may also include an area 620 providing additional ranked offers and indicating one or more differences (longer length of loan, lower interest rate, lower monthly payment, etc.) between the ranked offers and the offer terms of the accepted transaction proposal. The ranked offers may be selectable by the user operating client device 102. Additionally or alternatively, interface 600 may present the identified transaction structures in a spider graph (e.g., web chart, star chart, star plot, cobweb chart, irregular polygon, polar chart, kiviat diagram, etc.) having radii representing, for example, various variable terms of the transaction. Interface 600 may additionally include a selectable tem 630 for receiving additional alternative offers.

As depicted in FIG. 6B, an interface 650 may become generated with a area 660 indicating that the transaction proposal is rejected. Interface 650 may also include an area 670 providing alternative ranked offers and indicating one or more differences (different vehicle, larger cash down payment, etc.) between the ranked offers and the offer terms of the rejected transaction proposal. The ranked offers may be selectable by the user operating client device 102. Interface 600 may additionally include a selectable tem 630 for receiving additional alternative offers.

Figure 7A:
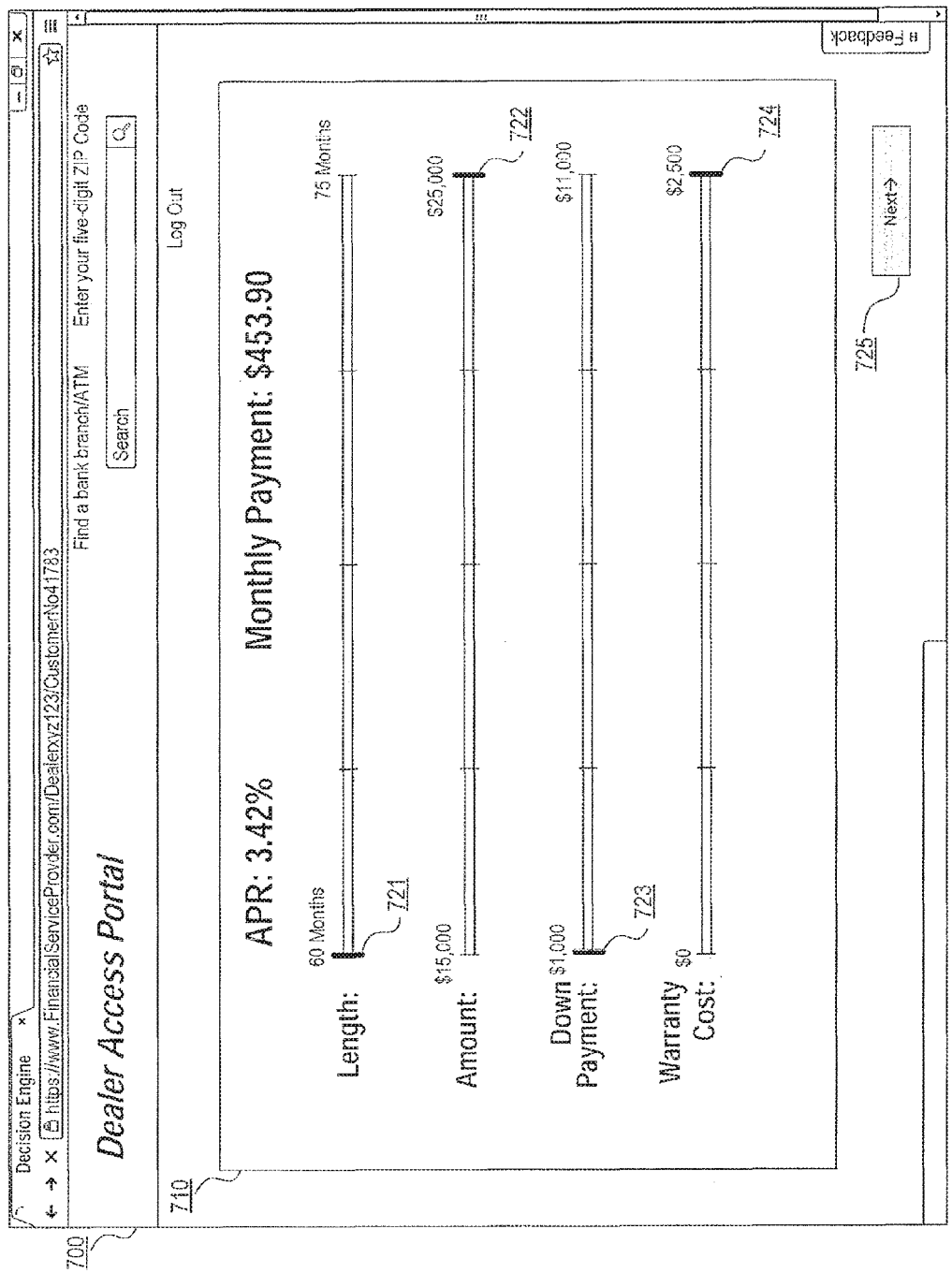
FIGS. 7A-B are exemplary interfaces for presenting offers, consistent with disclosed embodiments.
Figure 7B:
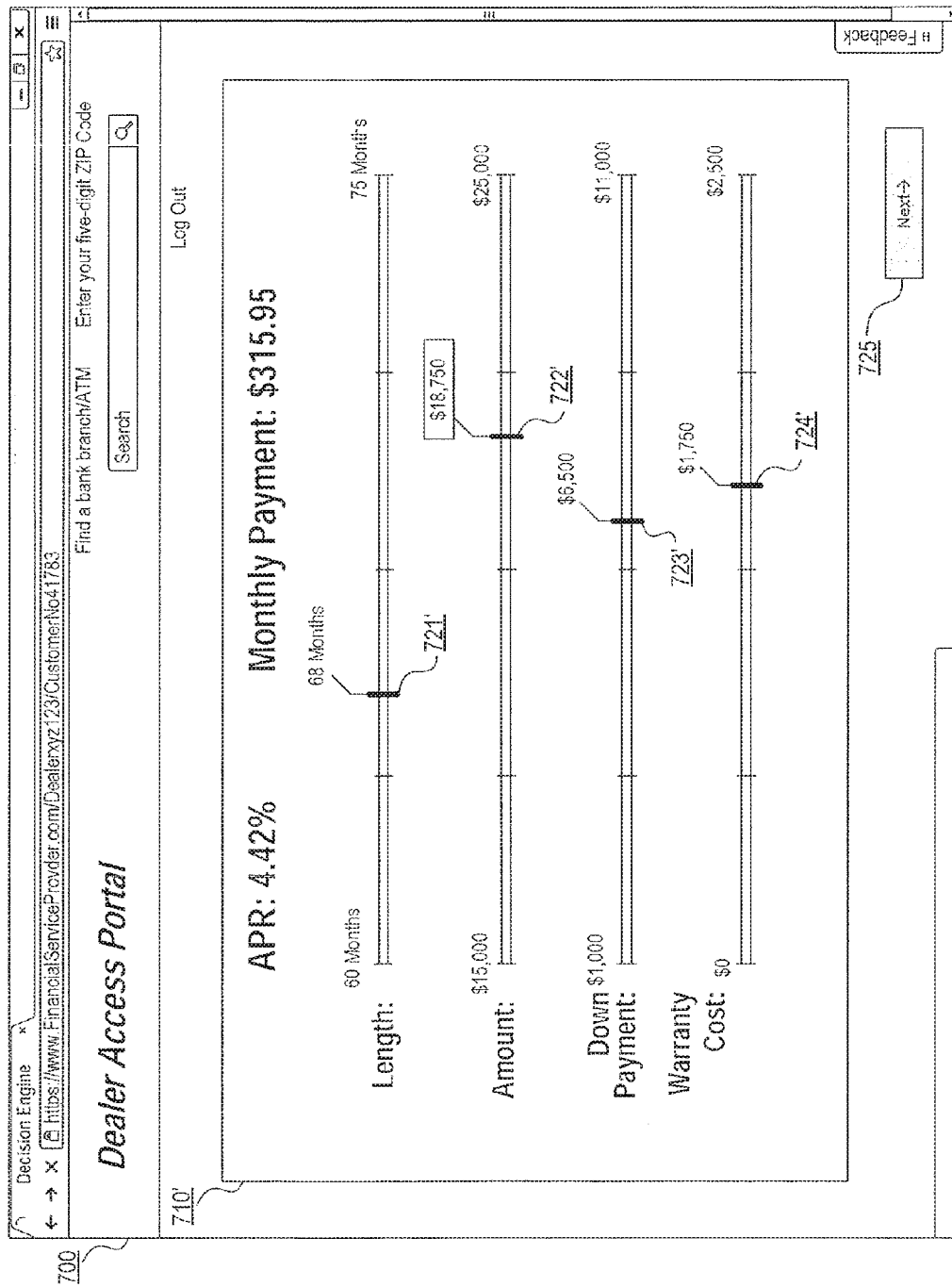

FIGS. 7A-B are exemplary interfaces for presenting offers, consistent with disclosed embodiments. According to some embodiments, decision engine 108 may provide an interface 700 for presenting a plurality of offers and receiving user input associate with the plurality of offers. As shown in FIG. 7A, interface 700 may include an area 710 displaying an adjustable slider bar associated with each of a plurality of transaction parameters. For example, area 710 may include a length of loan slider bar 721, sales price slider bar 722, cash down slider bar 723, and warranty costs slider bar 724. The value range of each transaction parameter may be based on, for example, the transaction proposal and MVT. In some embodiments, decision engine 108 will present the slider bars as positioned at the values indicated in the transaction proposal (or the closest transaction parameters allowable where the transaction proposal became rejected). Thus, continuing the example discussed with respect to FIG. 5, area 710 indicates the length of loan slider bar 721 as set to 60 months, the sales price slider bar 722 as set to $25,000, the cash down slider bar 723 as set to $1,000, and the warranty costs slider bar 724 as set to $2,500.

A user may operate the device displaying interface 700 (e.g., client device 102) to manipulate the slider bars to change the transaction terms within the allowable range. For example, as depicted in FIG. 7B, the sales price slider bar 722' may be manipulated to $18,750. In some embodiments, when a user manipulates a slider bar of area 710', decision engine 108 may adjust the remaining slider bars as needed to conform to the underlying transaction policy. For example, as sales price slider bar 722' becomes set to $18,750, decision engine 108 may generate area 710' to simultaneously adjust the length of loan slider bar 721' as set to 68 months, the cash down slider bar 723' as set to $6,500, and the warranty costs slider bar 724' as set to $1,750. Interface 700 may further include a selectable item (e.g., a button) for receiving acceptance of an offer according to the transaction structure indicated by the slider bars.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and methods consistent with the present disclosure can be implemented as hardware alone. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for reducing computational loads associated with predicting transactions using scale-out computing of analytical models, comprising:
   a memory storing instructions; and
   one or more processors configured to execute the instructions to perform operations comprising:
      receiving, via an Application Programming Interface (API), a transaction proposal including a first plurality of transaction parameters;
      identifying, via an actor pool associated with a data interface module, a plurality of data sources, the plurality of data sources being identified based on the transaction proposal;
      iteratively verifying, via an actor pool associated with the data interface module, the plurality of data sources;
      generating, via a minimally viable transaction (MVT) generator, an MVT, the MVT comprising a second plurality of transaction parameters and being based on the transaction proposal;
      generating, via an actor pool associated with a transaction generator, a first plurality of transaction options, the first plurality of transaction options being generated based on the transaction proposal and the MVT;
      scoring, via an actor pool associated with a scoring engine, the MVT and at least one of the first plurality of transaction options, the MVT and the transaction options being scored using an analytical model;
      verifying, via an actor pool associated with a policy calculator, that the MVT and the transaction options comply with a transaction policy, the MVT and the transaction options being verified based on the scoring;
      optimizing, via an actor pool associated with a transaction optimizer, the transaction options based on a preference; and
      transmitting, via the API:
         data indicating whether the transaction proposal is approved, wherein whether the transaction proposal is approved is determined based on whether the MVT complies with the transaction policy, and
         at least one transaction offer based on the optimized transaction options.

2. The system of claim 1, wherein when the transaction proposal is rejected,
   the transaction generator is further configured to cause the one or more processors to generate, via the actor pool associated with the transaction generator, a second plurality of transaction options, the second plurality of transaction options being generated based on the transaction proposal and the MVT;
   the scoring engine is further configured to cause the one or more processors to score, via the actor pool associated with the scoring engine, at least one of the second plurality of transaction options, the at least one of the second plurality of transaction options being scored using the analytical model; and
   the policy calculator is further configured to cause the one or more processors to verify, via the actor pool associated with the policy calculator, that at least one of the second plurality of transaction options complies with the transaction policy, the at least one of the second plurality of transaction options being verified based on the scoring,
   wherein the API is further configured to cause the one or more processors to transmit the at least one of the second plurality of transaction options that complies with the transaction policy.

3. The system of claim 2, wherein the API is further configured to cause the one or more processors to transmit a ranking associated with each of the at least one of the second plurality of transaction options.

4. The system of claim 1, wherein at least one of the API, the data interface module, the MVT generator, the transaction generator, the scoring engine, the policy calculator, or the transaction optimizer comprise software modules.

5. The system of claim 4, wherein the software modules are operated on a remote system.

6. The system of claim 1, wherein the MVT represents a maximum extent for varying the first plurality of transaction parameters.

7. The system of claim 1, wherein the MVT generator comprises instructions that cause the one or more processors to:
   identify a variation increment for each of the first plurality of transaction parameters; and
   determine a plurality of transaction parameter variations between the first plurality of transaction parameters and second plurality of transaction parameters according to the variation increment.

8. The system of claim 1, wherein the analytical model comprises an applicant rating (AR) model and a structure rating (SR) model.

9. The system of claim 1, wherein the data interface module, the transaction generator, the scoring engine, the policy calculator, and the transaction optimizer comprise fault-tolerant and scalable applications.

10. The system of claim 1, wherein the data interface module, the transaction generator, the scoring engine, the policy calculator, and the transaction optimizer are implemented in at least one of a big data architecture, actor architecture, message bus architecture, or Lambda-based architecture.

11. The system of claim 1, wherein at least a portion of the operations are performed in parallel.

12. The system of claim 1, wherein at least one of the actor pools is configured to expand or contract based on a computational load associated with the operations associated with the at least one of the actor pools.

13. A method for reducing computational loads associated with predicting optimal transactions using scale-out computing of analytical models, comprising:
   receiving, via an Application Programming Interface (API), a transaction proposal including a first plurality of transaction parameters;
   identifying a plurality of data sources, the plurality of data sources being identified based on the transaction proposal;
   iteratively verifying the plurality of data sources;
   generating a minimally viable transaction (MVT), the MVT comprising a second plurality of transaction parameters and being based on the transaction proposal;
   generating a first plurality of transaction options, the first plurality of transaction options being generated based on the transaction proposal and the MVT;
   scoring the MVT and at least one of the first plurality of transaction options, the MVT and the transaction options being scored using an analytical model;

verifying that the MVT and the transaction options comply with a transaction policy, the MVT and the transaction options being verified based on the scoring;

optimizing the transaction options based on a preference; and transmitting, via the API:

data indicating whether the transaction proposal is approved, wherein whether the transaction proposal is approved is determined based on whether the MVT complies with the transaction policy, and at least one transaction offer based on the optimized transaction options.

14. The method of claim 13, further comprising:

generating a second plurality of transaction options, the second plurality of transaction options being generated based on the transaction proposal and the MVT;

scoring at least one of the second plurality of transaction options, the at least one of the second plurality of transaction options being scored using the analytical model;

verifying that at least one of the second plurality of transaction options complies with the transaction policy, the at least one of the second plurality of transaction options being verified based on the scoring; and transmitting the at least one of the second plurality of transaction options that complies with the transaction policy.

15. The method of claim 14, wherein the at least one of the second plurality of transaction options are transmitted when the transaction proposal is rejected.

16. The method of claim 14, further comprising:

transmitting a ranking associated with each of the at least one of the second plurality of transaction options.

17. The method of claim 13, wherein the MVT represents a maximum extent for varying the first plurality of transaction parameters.

18. The method of claim 13, wherein at least one first operation is performed on a first system and at least one second operation is performed on a second system.

19. The method of claim 13, wherein at least a portion of the operations are performed in parallel.

20. A method for reducing computational loads associated with predicting optimal transactions using scale-out computing of analytical models, comprising:

receiving, via an Application Programming Interface (API), a transaction proposal including a first plurality of transaction parameters;

identifying a plurality of data sources, the plurality of data sources being identified based on the transaction proposal;

iteratively verifying the plurality of data sources;

generating a minimally viable transaction (MVT), the MVT comprising a second plurality of transaction parameters and being based on the transaction proposal;

generating a first plurality of transaction options, the first plurality of transaction options being generated based on the transaction proposal and the MVT;

scoring the MVT and at least one of the first plurality of transaction options, the MVT and the transaction options being scored using an analytical model;

verifying that the MVT and the transaction options comply with a transaction policy, the MVT and the transaction options being verified based on the scoring;

optimizing the transaction options based on a preference;

generating a second plurality of transaction options, the second plurality of transaction options being generated based on the transaction proposal and the MVT;

scoring at least one of the second plurality of transaction options, the at least one of the second plurality of transaction options being scored using the analytical model;

verifying that at least one of the second plurality of transaction options complies with the transaction policy, the at least one of the second plurality of transaction options being verified based on the scoring; and transmitting, via the API:

data indicating whether the transaction proposal is approved, wherein whether the transaction proposal is approved is determined based on whether the MVT complies with the transaction policy, and at least one of the optimized transaction options or at least one of the second plurality of transaction options that complies with the transaction policy.

* * * * *